US009361738B2

(12) United States Patent
Gilbert et al.

(10) Patent No.: US 9,361,738 B2
(45) Date of Patent: *Jun. 7, 2016

(54) DIAGNOSTIC TOOL WITH SMART CAMERA

(71) Applicants: Bosch Automotive Service Solutions Inc., Warren, MI (US); Robert Bosch GmbH, Stuttgart (DE)

(72) Inventors: Harry Gilbert, Portage, MI (US); Thomas Bertosa, Chardon, OH (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/612,993

(22) Filed: Feb. 3, 2015

(65) Prior Publication Data

US 2015/0149028 A1  May 28, 2015

Related U.S. Application Data

(63) Continuation of application No. 13/027,596, filed on Feb. 15, 2011, now Pat. No. 8,989,950.

(51) Int. Cl.
*G01M 17/00* (2006.01)
*G06F 7/00* (2006.01)
(Continued)

(52) U.S. Cl.
CPC .......... *G07C 5/008* (2013.01); *G06F 17/30047* (2013.01); *G06Q 10/087* (2013.01); *G07C 2205/02* (2013.01)

(58) Field of Classification Search
CPC .......... G06Q 10/063112; G06Q 50/12; G06Q 10/20; G06Q 40/02; G06Q 30/06; G06Q 20/04; G06Q 10/10; G06Q 20/12; G06F 17/30321; G06F 17/50; G06F 17/30067; G06F 2217/04; G06F 2217/41; G06F 17/30345; G06F 21/31; G06F 3/017; G06F 21/32; G06F 3/016; G06F 3/167; G07C 5/008; G07C 5/08; G07C 5/085; G07C 10/06; G07C 2205/02; G07C 5/0808; G07C 9/00111
USPC ......... 701/31.5, 31.4, 1, 41, 29.4, 48, 2, 29.1, 701/33.2, 34.4, 32.8, 33.4; 705/28, 305, 705/26.81, 27.1, 7.14, 89, 13, 3, 302, 5, 705/14.58, 7.31, 7.17
See application file for complete search history.

(56) References Cited

U.S. PATENT DOCUMENTS 6,181,992 B1  1/2001  Gurne et al.
6,693,367 B1  2/2004  Schmeisser et al.
(Continued)

FOREIGN PATENT DOCUMENTS

KR    1020030051239 A    6/2003

OTHER PUBLICATIONS

International Search Report mailed Nov. 14, 2014 for PCT/US2014/048842 filed Jul. 30, 2014.
(Continued)

*Primary Examiner* — Calvin Cheung
*Assistant Examiner* — Luis A Martinez Borrero
(74) *Attorney, Agent, or Firm* — Maginot Moore & Beck LLP (57) ABSTRACT

A diagnostic tool that includes a smart camera. The smart camera can be used to capture an image of the part that needs to be replaced. The image can also include the bar code that may be attached to the part. The image can be used to search a parts information database for additional parts information such as part number, manuals, pictures, etc. A further search of a parts supplier's database can be conducted using a location of the diagnostic tool to determine the nearest parts supplier that has the part available and the best price.

6 Claims, 5 Drawing Sheets

(51) Int. Cl.
*G06F 19/00* (2011.01)
*G07C 5/00* (2006.01)
*G06F 17/30* (2006.01)
*G06Q 10/08* (2012.01)

(56) References Cited

U.S. PATENT DOCUMENTS

| | | | |
|---|---|---|---|
| 6,701,233 B2 * | 3/2004 | Namaky | G07C 5/0808 340/939 |
| 6,856,968 B2 | 2/2005 | Tetirick et al. | |
| 6,925,368 B2 * | 8/2005 | Funkhouser | G07C 5/0808 340/438 |
| 6,941,203 B2 * | 9/2005 | Chen | G06Q 90/00 324/500 |
| 7,069,125 B2 * | 6/2006 | Namaky | G06F 11/321 455/457 |
| 7,385,359 B2 * | 6/2008 | Dowling | B60Q 1/26 315/292 |
| 7,502,672 B1 | 3/2009 | Kolls | |
| 7,734,287 B2 * | 6/2010 | Ying | G05B 15/02 340/514 |
| 7,734,390 B2 | 6/2010 | Chen | |
| 7,809,482 B2 * | 10/2010 | Bertosa | G07C 5/008 340/438 |
| 7,962,271 B1 | 6/2011 | Thompson et al. | |
| 7,996,128 B2 * | 8/2011 | Bertosa | G07C 5/008 701/31.4 |
| 8,285,441 B2 * | 10/2012 | Bertosa | G07C 5/008 701/33.2 |
| 8,306,687 B2 * | 11/2012 | Chen | G06Q 10/20 235/380 |
| 8,600,610 B2 * | 12/2013 | Bertosa | G06Q 30/0639 701/33.2 |
| 8,930,067 B1 * | 1/2015 | Green | G06Q 20/127 345/168 |
| 8,954,222 B2 * | 2/2015 | Costantino | G05B 23/0272 701/29.1 |
| 2002/0007237 A1 * | 1/2002 | Phung | G05B 23/0216 701/31.4 |
| 2002/0077779 A1 | 6/2002 | Liebl et al. | |
| 2002/0152045 A1 * | 10/2002 | Dowling | B60Q 1/26 702/107 |
| 2002/0158583 A1 * | 10/2002 | Lys | B60Q 1/26 315/82 |
| 2003/0055812 A1 * | 3/2003 | Williams | G06F 17/30994 |
| 2005/0065678 A1 | 3/2005 | Smith et al. | |
| 2005/0125313 A1 * | 6/2005 | Untiedt | G06Q 10/087 705/28 |
| 2005/0144183 A1 * | 6/2005 | McQuown | B61L 27/0094 |
| 2006/0047617 A1 | 3/2006 | Bacioiu et al. | |
| 2006/0106508 A1 | 5/2006 | Liebl et al. | |
| 2006/0123231 A1 | 6/2006 | Lewis et al. | |
| 2006/0123692 A1 * | 6/2006 | Beronja | G07C 5/0808 43/61 |
| 2006/0161390 A1 | 7/2006 | Namaky et al. | |
| 2007/0005201 A1 * | 1/2007 | Chenn | G07C 5/008 701/31.5 |
| 2007/0032207 A1 | 2/2007 | Shah | |
| 2007/0032225 A1 | 2/2007 | Konicek et al. | |
| 2007/0050105 A1 | 3/2007 | Chinnadurai et al. | |
| 2007/0088465 A1 | 4/2007 | Heffington | |
| 2007/0100520 A1 | 5/2007 | Shah et al. | |
| 2008/0140281 A1 | 6/2008 | Morris et al. | |
| 2008/0249681 A1 | 10/2008 | Bertosa et al. | |
| 2009/0248545 A1 * | 10/2009 | Robinson | G06Q 30/0601 705/26.1 |
| 2009/0271062 A1 | 10/2009 | Grenn | |
| 2009/0276115 A1 | 11/2009 | Chen | |
| 2009/0299900 A1 | 12/2009 | Chen | |
| 2010/0106359 A1 | 4/2010 | Underdal et al. | |
| 2010/0127847 A1 | 5/2010 | Evans et al. | |
| 2010/0138701 A1 * | 6/2010 | Costantino | G05B 23/0272 714/49 |
| 2010/0174446 A1 | 7/2010 | Andreasen et al. | |
| 2010/0191621 A1 | 7/2010 | Hogan et al. | |
| 2010/0205450 A1 * | 8/2010 | Sarnacke | G07C 5/0808 713/185 |
| 2010/0211249 A1 | 8/2010 | McClellan | |
| 2010/0256861 A1 | 10/2010 | Hodges | |
| 2010/0256863 A1 | 10/2010 | Nielsen et al. | |
| 2010/0256864 A1 | 10/2010 | Ying | |
| 2010/0262335 A1 | 10/2010 | Brozovich | |
| 2010/0293081 A1 * | 11/2010 | Liu | G06Q 30/04 705/34 |
| 2011/0035096 A1 * | 2/2011 | Liebl | G07C 5/008 701/33.4 |
| 2011/0046842 A1 | 2/2011 | Smith | |
| 2011/0071720 A1 * | 3/2011 | Schondorf | G06Q 10/06 701/29.5 |
| 2011/0106371 A1 | 5/2011 | Jardine et al. | |
| 2011/0130905 A1 | 6/2011 | Mayer | |
| 2011/0276219 A1 | 11/2011 | Swaminathan et al. | |
| 2011/0288954 A1 * | 11/2011 | Bertosa | G01R 31/007 705/26.9 |
| 2012/0044086 A1 | 2/2012 | Ruther et al. | |
| 2012/0209470 A1 * | 8/2012 | Gilbert | G06F 17/30047 701/31.4 |
| 2012/0313771 A1 | 12/2012 | Wittliff, III | |
| 2012/0324075 A1 | 12/2012 | Bertosa et al. | |
| 2013/0001295 A1 | 1/2013 | Goncalves | |
| 2013/0041553 A1 | 2/2013 | Bertosa et al. | |
| 2013/0151065 A1 * | 6/2013 | Ricci | G06F 9/54 701/31.4 |
| 2013/0204484 A1 * | 8/2013 | Ricci | G06F 17/00 701/29.4 |
| 2014/0075356 A1 * | 3/2014 | Gray | G07C 5/008 715/771 |
| 2014/0088818 A1 | 3/2014 | Bertosa et al. | |
| 2014/0129077 A1 * | 5/2014 | Selkirk | G06F 11/0739 701/31.4 |
| 2014/0279707 A1 * | 9/2014 | Joshua | G06Q 30/0283 705/400 |
| 2014/0282256 A1 * | 9/2014 | Fish | G06F 3/04886 715/835 |
| 2015/0025788 A1 * | 1/2015 | Crain | G01S 5/02 701/400 |
| 2015/0039176 A1 * | 2/2015 | Fish | G07C 5/008 701/31.6 |

OTHER PUBLICATIONS

International Search Report dated Aug. 7, 2014 for PCT/US2014/030351 filed Mar. 17, 2014.

International Search Report & Written Opinion for PCT/US2012/024947, completed Jun. 2, 2012 (mailed Jun. 20, 2012).

* cited by examiner

DIAGNOSTIC TOOL WITH SMART CAMERA

This application is a continuation of U.S. patent application Ser. No. 13/027,596, entitled "Diagnostic Tool with Smart Camera" by Harry Gilbert et al. and filed on Feb. 15, 2011, which issued as U.S. Pat. No. 8,989,950 on Mar. 24, 2015 the disclosure of which is herein incorporated by reference in its entirety. The present invention relates generally to a vehicle diagnostic tool. More particularly, the present invention relates to a vehicle diagnostic tool with a smart camera.

FIELD OF THE INVENTION

The present invention relates generally to a vehicle diagnostic tool. More particularly, the present invention relates to a vehicle diagnostic tool with a smart camera.

BACKGROUND OF THE INVENTION

Vehicle diagnostic tools are used to diagnose issues in the vehicle under test. The diagnostic tools are built with increasing capabilities that include larger color screens that are capable of being read in direct sunlight, and internet and networking capabilities. The diagnostic tool can be directly linked to a vehicle's data link connector (DLC) in order to communicate with the vehicle's on-board diagnostic system, such as OBD-II (On Board Diagnostic). Once the diagnostic tool is connected to the DLC it can draw power from the vehicle's battery.

During diagnostic testing, components of the vehicle must be replaced. The technician often must identify the parts and the associated part numbers and call the various auto parts store to see if the part is in stock. Accordingly, it is desirable to provide a system and method that can identify the part and the part number and its availability.

SUMMARY OF THE INVENTION

A diagnostic tool equipped with a smart camera can be used to help identify parts and their associated part numbers and availability at a parts store. The camera can be used to take a picture of the part that needs to be replaced and the diagnostic tool using parts recognition software can identify the part and access the parts store's database to see if the part is available and the selling price.

In accordance with one embodiment of the present invention, a diagnostic tool for a vehicle is provided, which can include a processor to control functions of the diagnostic tool, a memory that stores a software to operate the diagnostic tool and a database of parts information, the memory communicates with the processor, a connector interface that connects the diagnostic tool to a data link connector in the vehicle, the connector interface communicates with the processor, a signal translator that allows the diagnostic tool to communicate with the vehicle in at least one communication protocol, the signal translator communicates with the processor, a display that displays information including the part information, the display communicates with the processor, a camera that takes an image of the part and communicates with the processor, and a housing surrounding the processor, the memory, the connector interface, the signal translator, and the display.

In accordance with another embodiment of the present invention, a diagnostic tool for a vehicle is provided, which can include a means for controlling the functions of the diagnostic tool, a means for storing a software to operate the diagnostic tool and a database of parts information, the means for storing communicates with the means for controlling, a means for interfacing with the diagnostic tool to a data link connector in the vehicle, the means for interfacing communicates with the means for controlling, a means for translating that allows the diagnostic tool to communicate with the vehicle in at least one communication protocol, the means for translating communicates with the means for controlling, a means for displaying information including the part information, the display communicates with the means for controlling, a means for imaging the part and communicates with the means for controlling, and a means for housing surrounding the means for controlling, the means for storing, the means for interfacing, the means for translating, and the means for displaying.

In accordance with yet another embodiment of the present invention, is a method of identifying a part which can include obtaining an image of a part that needs to be replaced from a camera, searching a part information database using the image for a part's information, the part information database located on a computing device that communicates with the camera, and identifying the part's information from the part information database based on the image.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout. An embodiment in accordance with the present invention provides a system such as a diagnostic tool to identify the part, locate its availability and pricing.

Figure 1:
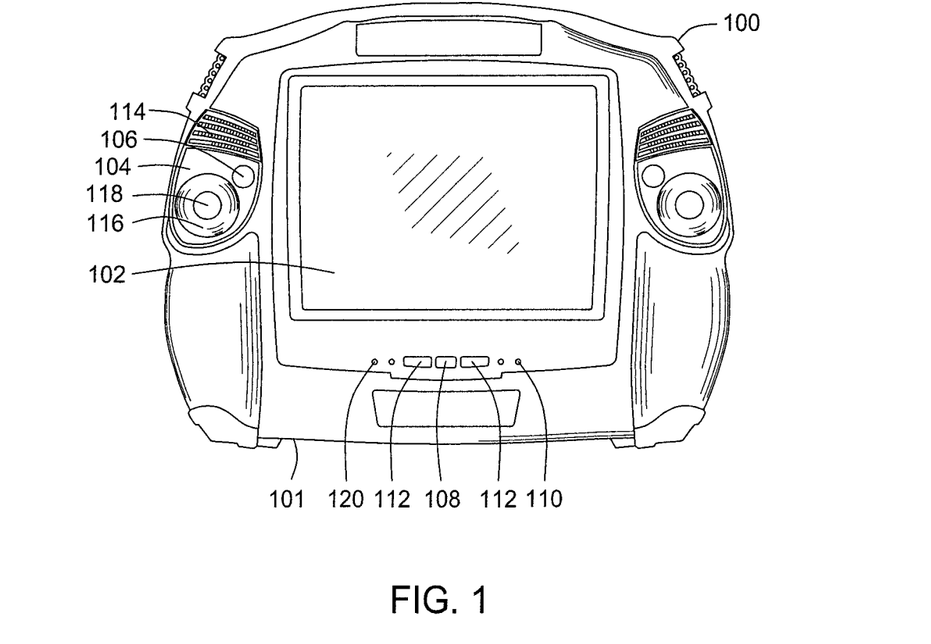
FIG. 1 illustrates a front view of a diagnostic tool according to an embodiment of the invention.

FIG. 1 illustrates a front view of a diagnostic tool 100 according to an embodiment of the invention. An example of the diagnostic tool is the Pegisys® from Service Solutions (Owatonna, Minn.), business unit of a SPX Corporation. The diagnostic tool 100 includes a housing 101, display 102, a scroll device (or input device) 104, a power button 108, LED indicators 110 and function buttons 112. The display can be any type of display including LCD, LED, VGA, OLED, SVGA and other types of displays including touch screen displays. The display may be a colored, non-colored (e.g. gray scale) or a combination of both. The display can display information such as the make, model, year of vehicles that the diagnostic tool can diagnose, the various diagnostic tests the diagnostic tool can run, diagnostic data the diagnostic tool has received, the baseline data of the various components in a vehicle, part images, parts information, and information from remote servers (internet, database information, etc). Additionally, the display can show videos for the user to view and the accompanying audio can be heard via the built in speakers 114. The speakers can be a single speaker or multiple speakers (as shown) for stereo sound. In one embodiment, the display allows the user to input selection through the touch screen for interactive navigation and selection, wherein the technician can select a menu item by touching the selection on the screen.

The scroll device 104 can be used to scroll through information or menus on the display, such as vehicle information or available diagnostic tests and used to input information. In one embodiment, there is one scroll device 104 and in another embodiment there are two or more scroll devices 104. When two scroll devices 104 are present, the user can have dual controls of the menus or the selections on the display. By having two scroll devices, it will be easier for a technician to use the diagnostic tool regardless if he was left-handed or right-handed. The scroll device includes an "enter" button 118 so that user can select the menu item, for example, a vehicle make, the part information, or a diagnostic test to run. The scroll device 104 also includes a scroll wheel 116 that can rotate around the "enter" button 118. The scroll wheel 116 also includes up, down, left and right arrow controls. The scroll wheel 116 allows the technician to move an indicator on the screen so that the information, such as menus can be scrolled and a selection on the screen can be made. The scroll wheel 116 is configured for a fast response or fast scrolling. The scroll device 104 also includes a scroll button 106, such as an "esc" (escape) button or any other button desired by the technician, such as a "back" or "forward" button. The scroll button 106 including any components of the scroll device 104 can be programmed for any desired functionality.

The face of the diagnostic tool 100 includes the power button 108 that allows the technician to power "ON" and "OFF" the diagnostic tool 100. The power button 108 can also be used to put the tool 100 into a standby mode in order to save battery power when not in use. Also on the face of the diagnostic tool are LEDs to indicate various status of the functionality of the diagnostic tools, such as wireless connectivity or network connectivity, low battery and any other indicators desired by the technician. The face of the diagnostic tool further includes function buttons 112 that when pressed allows a user to perform a specified function such as controlling the brightness of the display, volume of the speakers or any other function desired by the technician. A microphone 120 allows the technician to record information such as the noise being made by the vehicle for later analysis or for comparison with stored data. Further, the technician can also record comments or notes during the testing for later retrieval and analysis.

Figure 2:
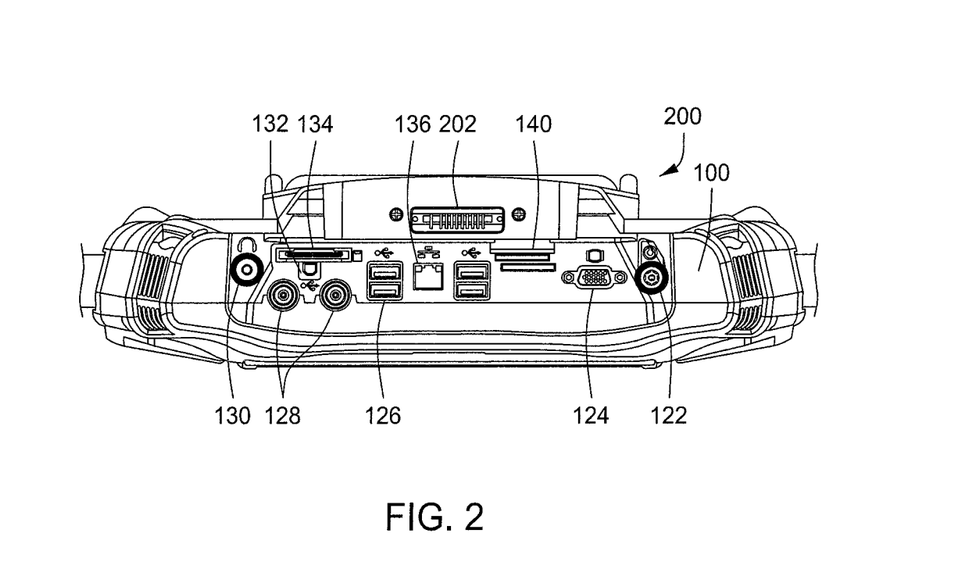
FIG. 2 is an upper view of the diagnostic tool according to an embodiment of the invention.

FIG. 2 is an upper view of the diagnostic tool 100 according to an embodiment of the invention. Turning to the connections available on the diagnostic tool 100, the diagnostic tool can be connected to an A/C power source via the A/C power connector 122. The A/C powers the diagnostic tool and recharges the diagnostic tool's internal battery (not shown). A VGA video connector 124 allows the information on the diagnostic tool 100 to be displayed on an external display, such as a display on a personal computer. Other display connector types can include HDMI for better graphics and sound.

A series of host USB (universal serial bus) connectors 126 are available to couple additional devices to the diagnostic tool 100. In one embodiment, there are four connectors, but more or less connectors are contemplated by the invention. Additional devices can add functionality to the diagnostic tool or allow the diagnostic tool 100 to add functionality to another device, such as a VCI (vehicle communication interface) 200. The functionality can include communications, printing, memory storage, video and other functionality. A two-channel scope connection 128 allows for a scope to be connected to the diagnostic tool 100. The scope allows for various measurement of signals such as volts, ohms, dwell, duty cycle, peak to peak, peak volts, injector pulse width, injector on time, firing kV, burn kV, burn voltage and other measurement of signals.

A stereo headphone connection 130 allows the technician to add a headphone to the diagnostic tool 100. A USB device slot 132 also adds functionality to the diagnostic tool by another device or adds functionality of the diagnostic tool to another device. An express card slot 134 is provided to add functionality, such as a wireless modem, memory, TV tuner, networking, mouse, remote control and other functionalities to the diagnostic tool 100. An Ethernet connector 136 allows for network connection with the diagnostic tool 100 in order to transfer data to and from the diagnostic tool to a remote device such as a server or personal computer. SDIO (Secure Digital Input Output) 140 card slots are provided on the diagnostic tool 100 to provide still additional functionality such as receivers, Wi-Fi or Bluetooth adapters, modems, Ethernet adapters, barcode readers, IrDA adapters, FM radio tuners, TV tuners, RFID readers, and mass storage media such as hard drives and flash drives. The connections are not limited to what are shown in FIG. 2, but additional connectors are contemplated such as Firewire, HDMI, and serial connections.

Figure 3:
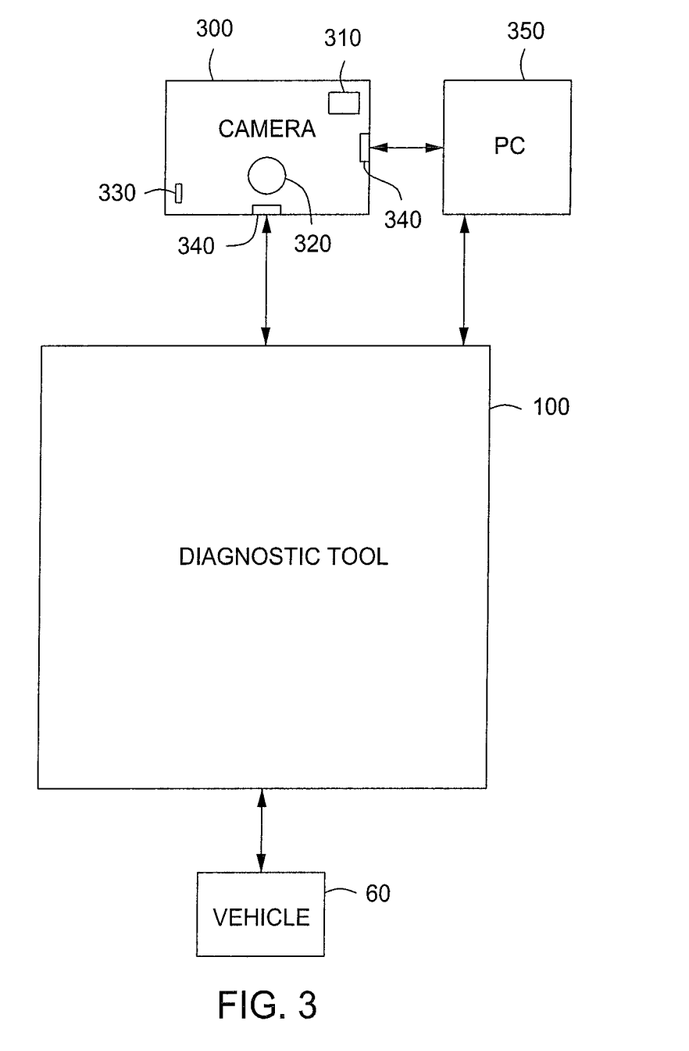
FIG. 3 is a block diagram illustrating an image recording device coupled to diagnostic tool of FIG. 1 according to one embodiment of the present invention.

FIG. 3 is a block diagram illustrating an image recording device 300 coupled to diagnostic tool 100 of FIG. 1 according to one embodiment of the present invention. In particular, FIG. 3 illustrates the image recording device such as a smart camera 300 that records still images or video. The smart camera 300 includes a lens 320, or two or as many as needed, a flash 310, a microphone 330, connectors 340 (wired or wireless connection) and a display (not shown). Optionally the smart camera has at least one speaker to provide audio to the technician and its own memory and power source. Thus, the smart camera can save information to the diagnostic tool, any computing device (discussed below) or itself. The lens zoom and focus features could also be digitally enhanced by software on the diagnostic tool or the camera.

The smart camera 300 that is capable of recording still images, a series of still images at predetermined times and number(s), or as a video. As shown in FIG. 3, the smart camera 300 can be in circuit communication with the diagnostic tool 100, or other pass through devices, via a serial port, USB (universal serial bus), BLUETOOTH, FIREWIRE, etc., and transmit images back to the diagnostic tool 100 or a computing device 350, where the images or video will be displayed.

The connection between the smart camera 300 and the diagnostic tool 100 can be wired or wireless using the various methods of connection and protocols as discussed herein. In an alternative, the camera can be built into the diagnostic tool itself (401 of FIG. 4). The communication can be bi-directional or mono-directional. The smart camera 300 can be used to take pictures of the various parts of the vehicle include the parts that may be faulty. The smart camera 300 can also be used to take a picture of the vehicle or device that the part is used for. This way the vehicle or device can also be identified using a database (vehicle or device, etc.) similar to the ones described herein. The smart camera can be used to train technicians including using the smart camera to take pictures of how the parts fits in the vehicle and its location so that the technician can be use the pictures to put the parts back in the proper place if needed.

In one embodiment, the technician can use the smart camera 300 to take a picture of a faulty part. A parts image database 412 (FIG. 4) stored on the diagnostic tool or remotely can be used to identify the part by using image recognition software. The image database can contain images of the parts or other information such as bar code information, etc. Certain portions (identifying points and measurements) or the whole profile of the part can be used to compare the part to images of parts of a vehicle or device stored in the parts image database. The image recognition software should be able to use various characteristics of the part to conduct the search. These characteristics include measurements of the part, wiring, connections, color(s), contrast (part versus the background of the vehicle), surface characteristics of the part, etc.

The search of the parts image database will proceed faster if the vehicle (or device) identification information for the vehicle (or device) under test is entered into the diagnostic tool so that the search is limited to the parts of the entered vehicle (or device). The vehicle identification information can include the VIN (vehicle identification number), make, model, year or other vehicle identifiable characteristics (hybrid, electric, etc.). Other search parameters can be used to narrow down the search such as major categories such as transmission, brake, interior, exterior, etc. Once the search identifies the part(s), the information related to the part can be displayed on a display screen of the diagnostic tool (other computing device) for verification by the technician. Optionally, the camera's display can also be used to display the information. In other embodiments, the image (and other information) can be sent to a smart phone so that the technician can have a portable image with him at the parts store. The information can include the part's number, diagrams on how to remove and replace the part, diagrams on where the part is located on the vehicle, manuals for the part, specifications about the parts, warranty information, oem (original equipment manufacturer) equivalent parts, etc. Once properly identified, additional information such as parts availability, pricing, location, etc. can be retrieved as discussed herein.

In another embodiment, the smart camera 300 also can function as bar code reader by being able to "read" bar codes on a part, for example. This may be completed through focusing the smart camera's lens on the bar code and then taking an image of the bar code. The bar code image or the information converted from the bar code image can be used to search to the parts image database. Once identified, the bar code information can provide information such as the part's number to the technician. Further, information such as parts availability, pricing, location, etc. can be retrieved as discussed further below.

Figure 4:
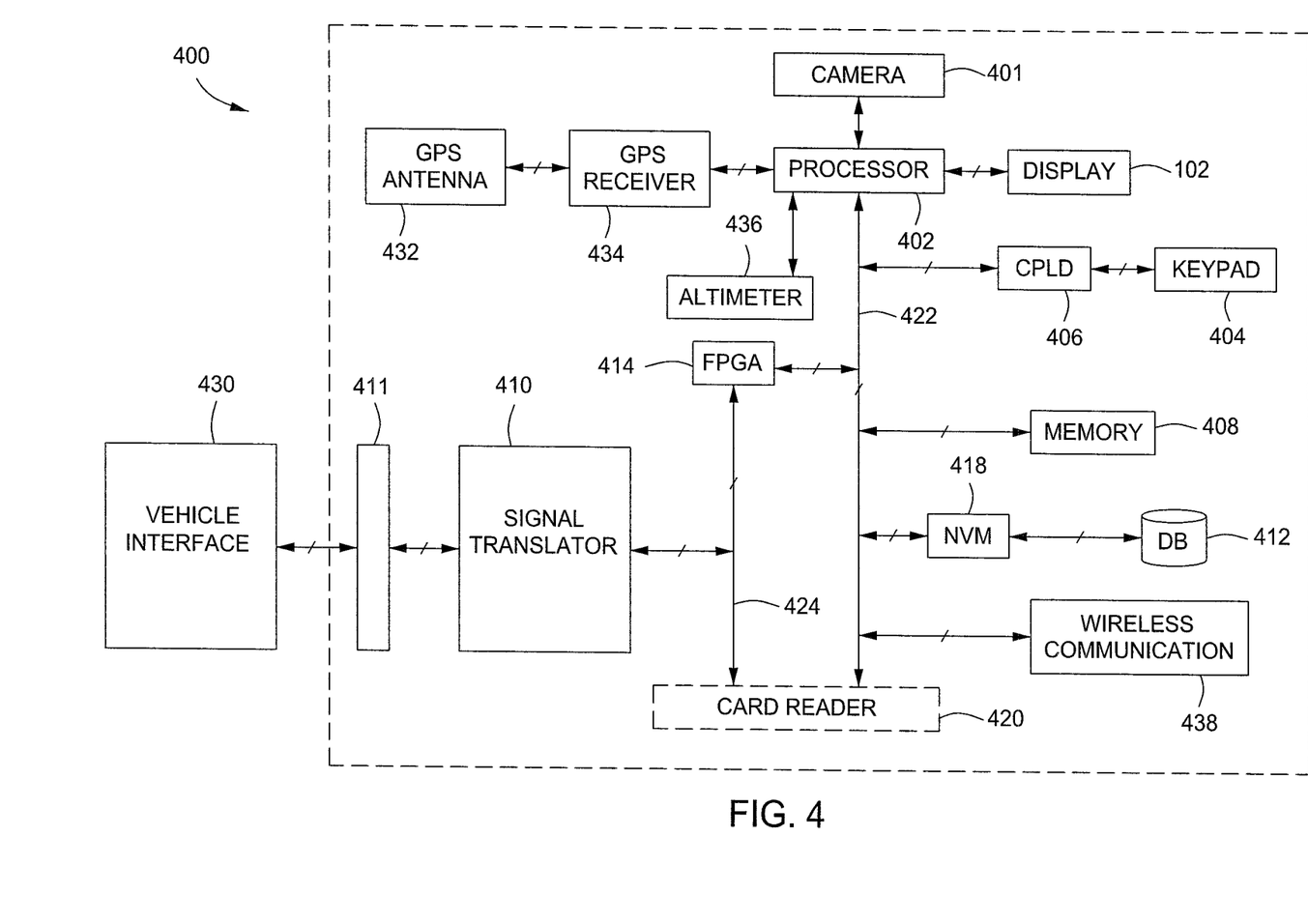
FIG. 4 is a block diagram of the components of the diagnostic tool according to an embodiment of the invention.

FIG. 4 is a block diagram of the components of the diagnostic tool 100 according to an embodiment of the invention. In FIG. 4, the diagnostic tool 100 according to an embodiment of the invention includes the smart camera 401, a processor 402, a field programmable gate array (FPGA) 414, a first system bus 424, the display 102, a complex programmable logic device (CPLD) 406, the input device in the form of a keypad 404 (scroll device), a memory subsystem 408, an internal non-volatile memory (NVM) 418 having the parts image database 412, a card reader 420 (optional), a second system bus 422, a connector interface 411, a selectable signal translator 410, a GPS antenna 432, a GPS receiver 434, an optional altimeter 436 and wireless communication circuit 438. A vehicle communication interface 430 of the vehicle under test is in communication with the diagnostic tool 100 through connector interface 211 via an external cable (not shown).

Selectable signal translator 410 communicates with the vehicle communication interface 430 through the connector interface 411. Signal translator 410 conditions signals received from an ECU unit through the vehicle communication interface 430 to a conditioned signal compatible with diagnostic tool 100. Signal translator 410 can communicate with, for example, the following communication protocols: J1850 (VPM and PWM), ISO 9141-2 signal, communication collision detection (CCD) (e.g., Chrysler collision detection), data communication links (DCL), serial communication interface (SCI), Controller Area Network (CAN), Keyword 2000 (ISO 14230-4), OBD II or other communication protocols that are implemented in a vehicle.

The circuitry to translate and send in a particular communication protocol can be selected by FPGA 414 (e.g., by tri-stating unused transceivers) or by providing a keying device that plugs into the connector interface 411 that is provided by diagnostic tool 100 to connect diagnostic tool 100 to the vehicle communication interface 430. Signal translator 410 is also coupled to FPGA 414 and the card reader 420 via the first system bus 424. FPGA 414 transmits to and receives signals (i.e., messages) from the ECU unit through signal translator 410.

The FPGA 414 is coupled to the processor 402 through various address, data and control lines by the second system bus 422. FPGA 414 is also coupled to the card reader 420 through the first system bus 424. The processor 402 is also coupled to the display 102 in order to output the desired information to the user. The processor 402 communicates with the CPLD 406 through the second system bus 422. Additionally, the processor 402 is programmed to receive input from the user through the user interface 404 via the CPLD 406. The CPLD 406 provides logic for decoding various inputs from the user of the diagnostic tool 100 and also provides glue-logic for various other interfacing tasks.

Memory subsystem 408 and internal non-volatile memory 418 are coupled to the second system bus 422, which allows for communication with the processor 402 and FPGA 414. Memory subsystem 408 can include an application dependent amount of dynamic random access memory (DRAM), a hard drive, and/or read only memory (ROM). Software to run the diagnostic tool 100 can be stored in the memory 408 or 418, including any other database. The database can include diagnostic information and other information related to vehicles.

In one embodiment, the parts image database can be located on a remote computing device instead of being local on the diagnostic tool. The remote parts image database can be accessed via a wireless or wired connection. The remote parts image database can also be stored on an external memory, such as a compact flash card or other memories and accessed locally by the diagnostic tool.

Internal non-volatile memory 418 can be an electrically erasable programmable read-only memory (EEPROM), flash ROM, or other similar memory. Internal non-volatile memory 418 can provide, for example, storage for boot code, self-diagnostics, various drivers and space for FPGA images, if desired. If less than all of the modules are implemented in FPGA 414, memory 418 can contain downloadable images so that FPGA 414 can be reconfigured for a different group of communication protocols.

The GPS antenna 432 and GPS receiver 434 may be mounted in or on the housing 101 or any combination thereof. The GPS antenna 432 electronically couples to the GPS receiver 434 and allows the GPS receiver to communicate (detects and decodes signals) with various satellites that orbit the Earth. In one embodiment, the GPS antenna and GPS receiver are one device instead of two. The GPS receiver 434 and GPS antenna 432 electronically couple to the processor 402, which is coupled to memory 408, NVM 418 or a memory card in the card reader 420. The memories can be used to store cartographic data, such as electronic maps. The diagnostic tool can include all the maps for the U.S. (or country of use), North America or can have the region or state where the diagnostic tool is located. In alternative embodiments, the diagnostic tool can have all the maps of the world or any portion of the world desired by the user. This allows the diagnostic tool to be a GPS device so that a driver can drive from one location to another. The maps may be over lay or incorporates with traffic, local events, and location of other GPS devices (smart phones) and other information that can be useful to the technician. By being able to locate other diagnostic tools with GPS, then the technicians may be able to use the diagnostic tools to locate each other in order to conduct a meeting or have a social event.

The GPS receiver communicates with and "locks on" to a certain number of satellites in order to have a "fix" on its global location. Once the location is fixed, the GPS receiver, with the help of the processor, can determine the exact location including longitude, latitude, altitude, velocity of movement and other navigational data of the diagnostic tool 100.

Should GPS receiver be unable to lock onto the minimum number of satellites to determine the altitude or unable to determine the altitude for any reason, the altimeter 436 can be used to determine the altitude of the diagnostic tool 100. The altimeter 436 is electronically coupled to the processor 402 and can provide the altitude or elevation of the diagnostic tool 100. The altimeter 436 can be coupled to a barometric pressure sensor (not shown) in order to calibrate the elevation measurements determined by the altimeter. The sensor can be positioned interior or exterior to the housing 101 of the diagnostic tool 100. Minor atmospheric pressure changes can affect the accuracy of the altimeter, thus, diagnostic tool can correct for these changes by using the sensor in conjunction with the altimeter along with a correction factor known in the art.

Figure 5:
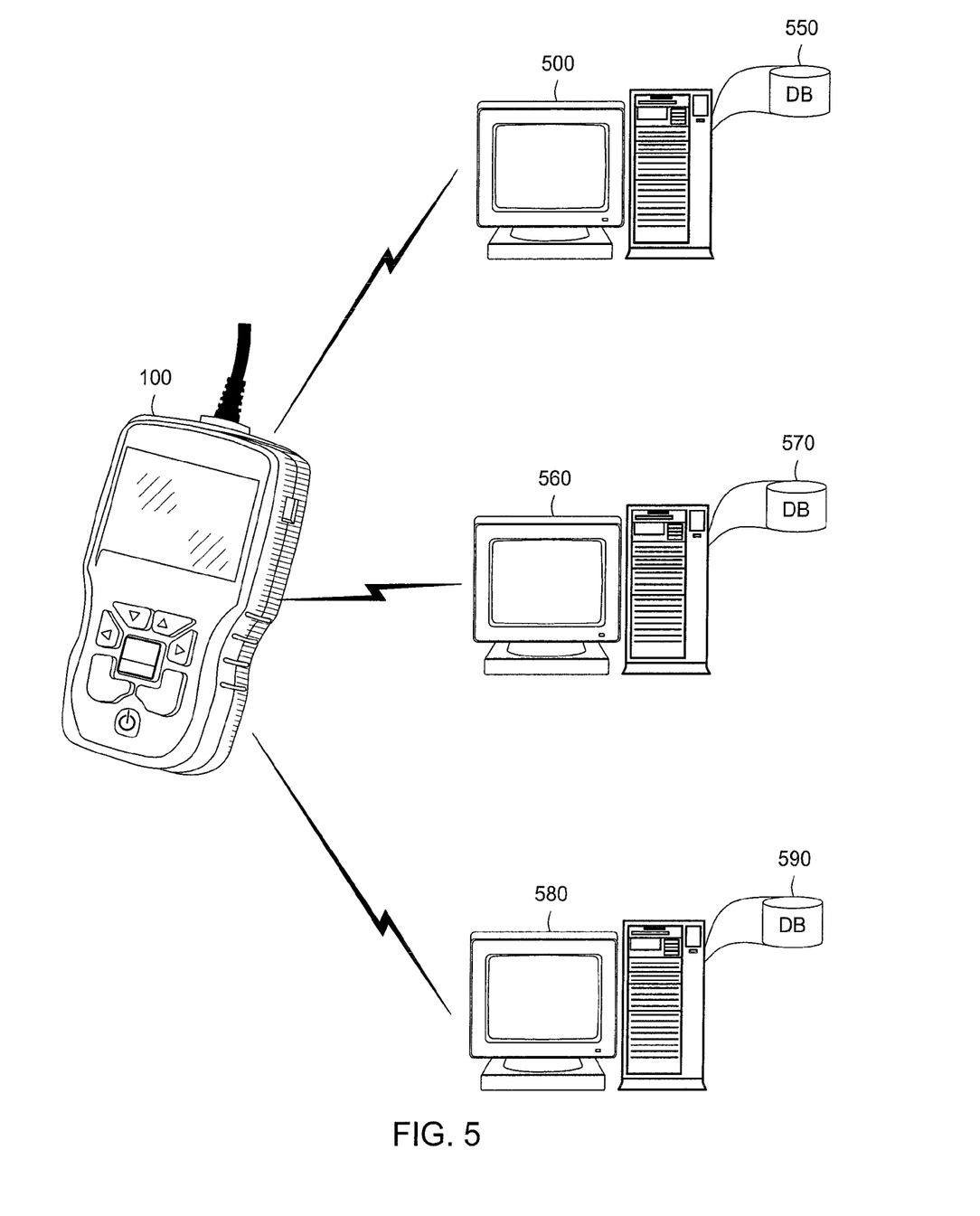
FIG. 5 illustrates the tool communicating with the remote computing devices having the remote parts imaging database according to another embodiment of the invention.

Wireless communication circuit 438 communicates with the processor 402 via the second bus system 422. The wireless communication circuit can be configured to communicate via RF (radio frequency), satellites, cellular phones (analog or digital), Bluetooth®, Wi-Fi, Infrared, Zigby, Local Area Networks (LAN), WLAN (Wireless Local Area Network), other wireless communication configurations and standards or a combination thereof. The wireless communication circuit 438 allows the diagnostic tool to communicate with other devices wirelessly such as with a remote computing device 500 (FIG. 5) having remote databases. In one embodiment, the database includes the parts image database 550 (FIG. 5). The wireless communication circuit 438 includes an antenna built therein and being housed within the housing 101 or can be externally located on the housing 101.

FIG. 5 illustrates the tool 100 communicating with the remote computing devices 500, 560, 580 having the remote parts imaging database according to another embodiment of the invention. As previously stated, the tool 100 includes the ability to access the remote computing devices via a wired or wireless connection. In this embodiment, the tool 100 is wirelessly communicating with the remote computing device 500 that stores the parts image database in the event the additional information is not stored locally on the diagnostic tool. In this embodiment, the parts image database can be used to search for the correct part and parts number based on the images captured by the smart camera including the bard code image.

The remote computing devices 500, 560, 580 can be located in the garage that the tool 100 is being used or located in another location such as another building, another part of the city, another city, county, state or country. The wireless connection can also be via a distributed network, such as the Internet.

In one embodiment, the remote computing devices 560, 580 may be parts suppliers computing devices that contain respective parts information databases. The parts information can include pricing, warranty, availability, diagrams, manuals, delivery options including mailing and local delivery, and other parts information. Thus, once the part(s) that needs replacement is identified, the parts supplier's computing devices 560, 580 that contains the parts databases 570, 590 (respectively) can be accessed to determine the price and availability of the part. The GPS location of the diagnostic tool can be used so that the nearest part supplier can be located with the part available for purchase and the best price. This will save time and provide options so that the technician can choose to travel to the parts store to purchase the part, have the part delivered locally or shipped by interacting with a web site stored on the parts supplier's computing device, or simply place it on hold for pick up when desired. Additionally, other parts stores that have the part available can also be displayed so that the technician has a choice to go other stores in the event he has to run other errands or is on the way home or returning back to work.

Figure 6:
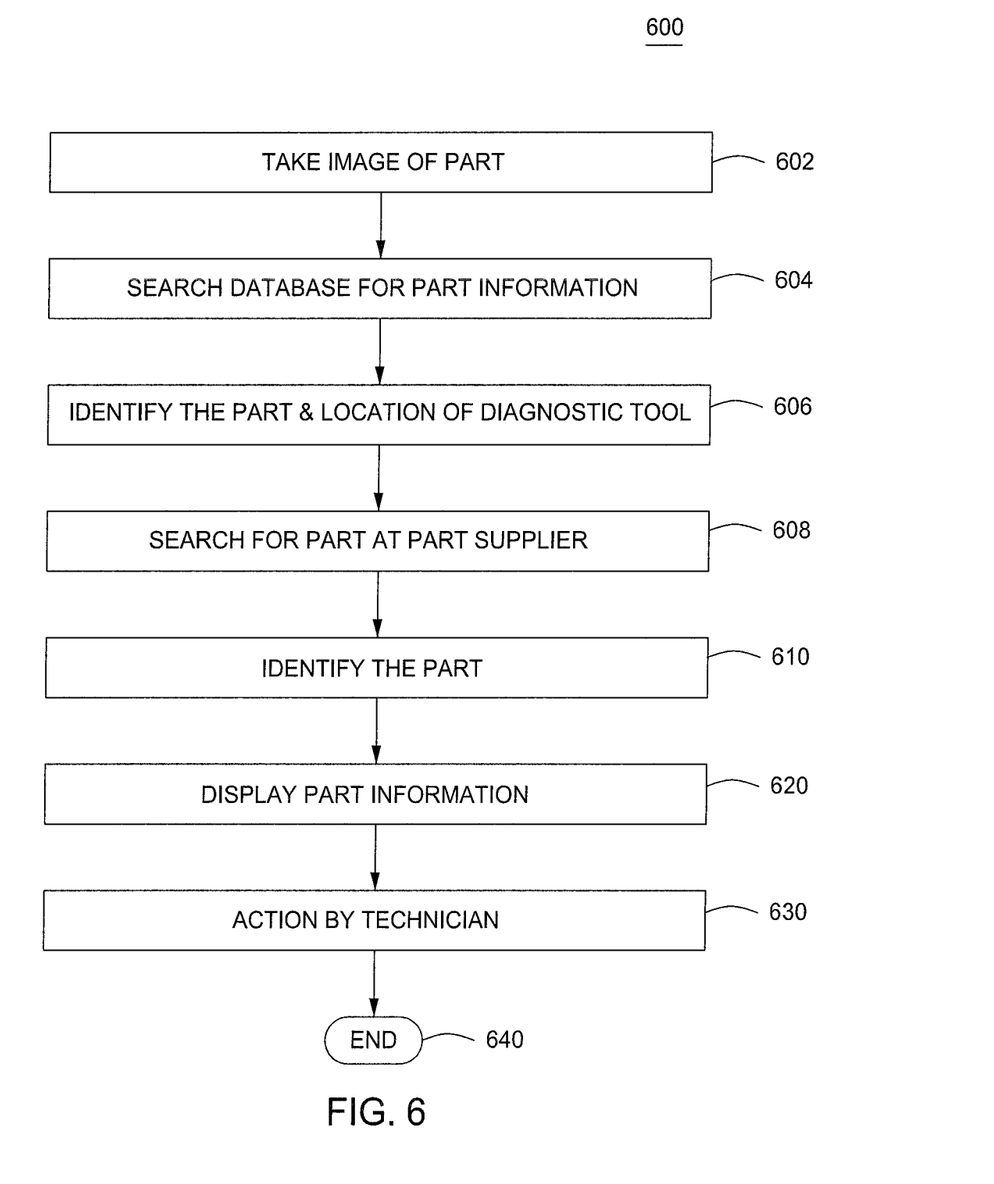
FIG. 6 illustrates the steps of identifying and obtaining information for a part that needs to be replaced according to an embodiment of the invention.

FIG. 6 illustrates the steps of identifying and obtaining information for a part that needs to be replaced according to an embodiment of the invention. The method of indentifying and obtaining information about the part 600 starts at step 602. At step 602, the smart camera can be used to take an image of the part that needs to be replaced or identified. The smart camera can simply take a picture of the part or if the bar code is available, then the smart camera can take a picture of the bar code. At step 604, a search of the parts image database is conducted. The parts image database can be located on the diagnostic tool 100 or on a remote computing device 500 or both. At step 606, the diagnostic tool and/or the remote computing device 500 can identify the part and provide the part information such as the part number, the amount of the part that would be needed to be replaced or other part identifying characteristics. For example, it is recommended to replace two tires or shocks at a time instead of one. The location of where the part (and indirectly the technician) is located can be determined based on the GPS coordinate of the diagnostic tool 100 using the tool's GPS components.

At step 608, the diagnostic tool or the computing device 500 can communicate with the parts suppliers' computing devices 560, 580 to search for the part. At step 610, the part is identified based on the information sent to the parts suppliers' computing devices. At step 610, the part information can be displayed to the technician on a display of the diagnostic tool 100 or remote computing device 500 or the camera. The part information can include pricing (costs, retail, discounted, etc.), availability including the location of the parts and if not available, alternative locations of the part or when the part is expected to be available and if there are alternatives (generic parts) that are available for the original equipment manufacture part. At step 640, the technician can take action depending on the information displayed to him including ordering and purchasing the part to be delivered (if locally available) or shipped, or placing the part on hold for pickup at a later time and other actions. Alternatively, the technician can take no action based on the information provided or any other reason. The method ends at step 640.

The embodiments described herein can be used in other areas beyond vehicle and their components. Other areas include devices, buildings or anything that have components that are replaceable such as computing devices, and refrigeration devices, heating devices, etc.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic tool for a vehicle, comprising:
 a processor configured to control functions of the diagnostic tool;
 a memory that stores a software to operate the diagnostic tool and a database of parts information, the memory communicates with the processor;
 a connector interface configured to connect the diagnostic tool to a data link connector in the vehicle, the connector interface communicates with the processor;
 a signal translator configured to allow the diagnostic tool to communicate with the vehicle in at least one communication protocol, the signal translator communicates with the processor;
 a display configured to display information including the part information, the display communicates with the processor;
 an imaging device configured to take an image of the part and communicates with the processor;
 a housing surrounding the processor, the memory, the connector interface, the signal translator, and the display;
 a wireless communication interface configured to communicate with a part supplier's database to determine availability and pricing of the part; and
 an input device configured to communicate with the processor.

2. The diagnostic tool of claim 1, wherein the image is a bar code on the part that can be used to search the parts information database.

3. The diagnostic tool of claim 1, wherein:
 the imaging device includes a camera, and
 the processor uses the image of the part taken by the camera to search for part's information in the parts information database.

4. The diagnostic tool of claim 3, wherein the part's information include at least one of the following: part number, part specification, part diagram, and part manual.

5. The diagnostic tool of claim 1 further comprising a global positioning system configured to locate a location of the diagnostic tool so that the location can be used to find the nearest part supplier store that has the part available.

6. The diagnostic tool of claim 5, wherein the nearest part supplier store has the best price for the part.

* * * * *